(12) United States Patent
Kim et al.

(10) Patent No.: US 12,512,529 B2
(45) Date of Patent: Dec. 30, 2025

(54) AIR-COOLED BATTERY PACK FOR ELECTRIC VEHICLE

(71) Applicant: LG Energy Solution, Ltd., Seoul (KR)

(72) Inventors: Seok-Hee Kim, Daejeon (KR);
Ki-Young Kang, Daejeon (KR);
Byung-Doo Min, Daejeon (KR);
Eung-Gyu Lee, Daejeon (KR);
Hee-Joon Jin, Daejeon (KR); Hyuk-Ju Kim, Daejeon (KR); Sam-Hoe Heo, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 759 days.

(21) Appl. No.: 17/797,319

(22) PCT Filed: Oct. 13, 2021

(86) PCT No.: PCT/KR2021/014153
§ 371 (c)(1),
(2) Date: Aug. 3, 2022

(87) PCT Pub. No.: WO2022/097943
PCT Pub. Date: May 12, 2022

(65) Prior Publication Data
US 2023/0057377 A1 Feb. 23, 2023

(30) Foreign Application Priority Data
Nov. 5, 2020 (KR) .......................... 10-2020-0146830

(51) Int. Cl.
*H01M 10/6551* (2014.01)
*H01M 10/625* (2014.01)
(Continued)

(52) U.S. Cl.
CPC ..... *H01M 10/6551* (2015.04); *H01M 10/625* (2015.04); *H01M 10/6553* (2015.04); *H01M 10/6556* (2015.04); *H01M 2220/20* (2013.01)

(58) Field of Classification Search
CPC ........... H01M 10/6551; H01M 10/625; H01M 10/6553; H01M 10/6556; H01M 2220/20;
(Continued)

(56) References Cited

U.S. PATENT DOCUMENTS

2007/0196728 A1* 8/2007 Yang .................... H01M 10/613
165/41
2007/0216371 A1* 9/2007 Yoon ....................... B60L 50/64
320/150
(Continued)

FOREIGN PATENT DOCUMENTS

| CN | 102815203 A | 12/2012 |
|---|---|---|
| CN | 103107382 A | 5/2013 |

(Continued)

OTHER PUBLICATIONS

International Search Report for PCT/KR2021/014153 dated Jan. 27, 2022. 3 pgs.

(Continued)

*Primary Examiner* — Jack Chiang
*Assistant Examiner* — Brandon Bowers
(74) *Attorney, Agent, or Firm* — Lerner David LLP (57) ABSTRACT

An air-cooled battery pack is provided, including a plurality of battery modules; a pack case including an air inlet and an air outlet and provided to accommodate the plurality of battery modules; a cooling channel formed between the plurality of battery modules and a bottom surface of the pack case; an inlet duct module configured to form an air passage from the air inlet to the cooling channel; and an outlet duct module including at least one exhaust fan installed within (Continued)

the pack case and provided to forcedly exhaust air to outside of the pack case by forming an air passage from the cooling channel to the air outlet.

9 Claims, 5 Drawing Sheets

(51) Int. Cl.
*H01M 10/6553* (2014.01)
*H01M 10/6556* (2014.01)

(58) Field of Classification Search
CPC ............ H01M 50/204; H01M 10/613; H01M 10/6563; H01M 10/6566; H01M 50/20; Y02E 60/10; B60Y 2200/91
See application file for complete search history.

(56) References Cited

U.S. PATENT DOCUMENTS

| | | | |
|---|---|---|---|
| 2009/0258282 A1* | 10/2009 | Harada | H01M 10/613 |
| | | | 429/61 |
| 2012/0312610 A1 | 12/2012 | Kim et al. | |
| 2013/0122338 A1 | 5/2013 | Katayama et al. | |
| 2014/0072846 A1 | 3/2014 | Oh et al. | |
| 2014/0308559 A1 | 10/2014 | Hwang | |
| 2015/0037632 A1 | 2/2015 | Yamamoto et al. | |
| 2016/0093929 A1 | 3/2016 | Obasih et al. | |
| 2017/0033420 A1 | 2/2017 | Dudley et al. | |
| 2019/0198951 A1 | 6/2019 | Tong et al. | |

FOREIGN PATENT DOCUMENTS

| | | |
|---|---|---|
| CN | 210074100 U | 2/2020 |
| JP | H11178115 A | 7/1999 |
| JP | 2010198937 A | 9/2010 |
| JP | 2013105618 A | 5/2013 |
| JP | 201453279 A | 3/2014 |
| JP | 201562163 A | 4/2015 |
| JP | 2019-530191 A | 10/2019 |
| KR | 20140007089 A | 1/2014 |
| KR | 20140137502 A | 12/2014 |
| KR | 20150000378 A | 1/2015 |
| KR | 20170117475 A | 10/2017 |
| KR | 101878809 B1 | 8/2018 |

OTHER PUBLICATIONS

Extended European Search Report including Written Opinion for Application No. 21889408.7 dated May 13, 2024, pp. 1-6.
Search Report dated Mar. 12, 25 from the Office Action for Chinese Application No. 202180013844.8 Issued Mar. 15, 2025, pp. 1-2.

* cited by examiner

FIG. 1

PRIOR ART

AIR-COOLED BATTERY PACK FOR ELECTRIC VEHICLE

CROSS-REFERENCE TO RELATED APPLICATIONS

The present application is a national phase entry under 35 U.S.C. § 371 of International Application No. PCT/KR2021/014153 filed on Oct. 13, 2021, which claims priority to Korean Patent Application No. 10-2020-0146830 filed on Nov. 5, 2020 in the Republic of Korea, the disclosures of which are incorporated herein by reference.

TECHNICAL FIELD

The present disclosure relates to battery packs, and more particularly, to a battery pack having an exhaust fan embedded therein, as an air-cooled battery pack for electric vehicles.

BACKGROUND ART

Secondary batteries are batteries capable of being charged and discharged, in contrast with primary batteries that are unable to be charged, and are used as power sources for energy storage systems (ESSs), electric vehicles (EVs), or hybrid vehicles (HEVs) as well as small high-tech electronic devices such as mobile phones, PDAs, and notebook computers.

Currently, one secondary battery (cell) is unable to obtain an output sufficient enough to drive an electric vehicle. To apply a secondary battery as an energy source of an electric vehicle, a battery module in which a plurality of lithium ion battery cells are connected in series and/or in parallel needs to be configured, and generally, a battery pack including a battery management system (BMS), a cooling system, a battery disconnection unit (BDU), electric wiring cables, and the like, which connect the battery modules in series and functionally maintain the same, is configured.

In the case of battery modules for electric vehicles, as several to several tens of secondary battery cells are alternately charged and discharged, it is necessary to control such charge and discharge to maintain the battery modules in an appropriate operating state.

In particular, heat generated while a secondary battery is operating raises the temperature of the secondary battery, and thus, if the heat is not efficiently cooled, stability is greatly reduced, such as the lifespan of the secondary battery being shortened and malfunction occurring. Therefore, cooling is the most important task in the manufacture of battery packs including secondary batteries.

There are two types of cooling systems for battery packs: an air cooling type and a water cooling type. The water cooling type has a disadvantage in that the energy density of a battery pack decreases due to a short circuit, waterproofing of secondary batteries, and a large number of component parts added to a cooling path configuration. On the other hand, the air-cooling type has an advantage in that it is relatively free from a short circuit and waterproofing and can be connected with the air conditioning systems of electric vehicles.

Figure 1:
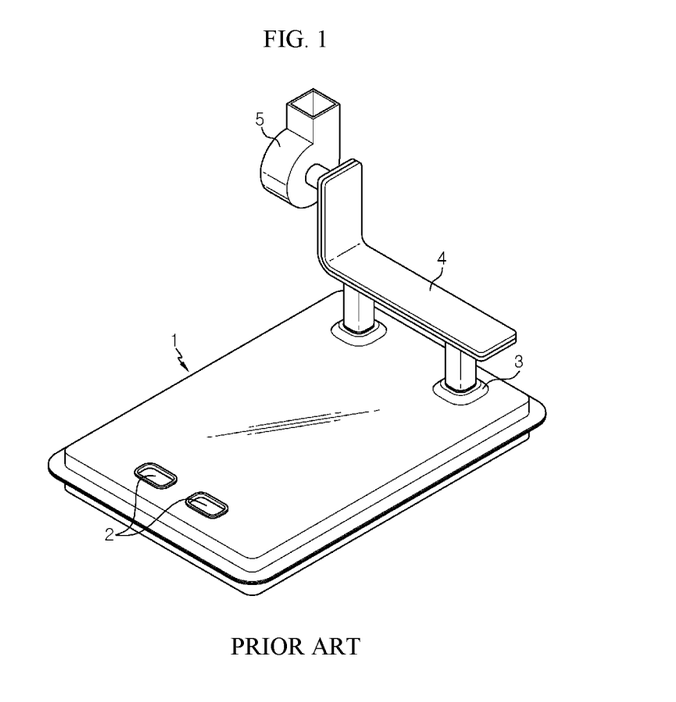
FIG. 1 is a schematic perspective view of a conventional air-cooled battery pack.

Referring to FIG. 1 as an example, an air-cooled battery pack 1 has an air inlet 2 and an air outlet 3 and may be mounted under a seat of a vehicle, and may be configured such that external air is introduced into the air-cooled battery pack 1 through the air inlet 2 to cool battery modules and is discharged to the outside through the air outlet 3.

In general, an exhaust fan 5 of 200 W or more is required to cause forced convection inside the air-cooled battery pack 1, and the exhaust fan 5 has a large size and is thus located outside the battery pack 1. For example, as shown in FIG. 1, one side of the exhaust fan 5 may be communicatively connected to a duct 4 communicating with the air outlet 3 of the battery pack, and the other side of the exhaust fan 5 may be connected to a pipe (not shown) communicating with the vehicle's exhaust port.

However, when there is the exhaust fan 5 outside the battery pack 1 as described above, problems occur, such as reduction in the quietness of a vehicle due to a fan noise when the fan is operating, difficulties in a layout design around the battery pack in the vehicle, and degradation in the effect of causing forced convection inside the battery pack as compared with an output of the exhaust fan 5.

Accordingly, there is a demand for an air-cooled battery pack capable of addressing conventional problems by comprehensively considering fan noise problem solving, space utilization, costs, and cooling performance.

DISCLOSURE

Technical Problem

The present disclosure is designed to solve the problems of the related art, and therefore the present disclosure is directed to providing an air-cooled battery pack having a fan embedded therein in order to reduce fan noise, optimize a cooling passage space, reduce costs, and have excellent cooling performance.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided an air-cooled battery pack including a plurality of battery modules; a pack case including an air inlet and an air outlet and provided to accommodate the plurality of battery modules; a cooling channel formed between the plurality of battery modules and a bottom surface of the pack case; an inlet duct module configured to form an air passage from the air inlet to the cooling channel; and an outlet duct module including at least one exhaust fan installed within the pack case and provided to forcedly exhaust air to outside of the pack case by forming an air passage from the cooling channel to the air outlet.

The pack case may include a pack tray on which the plurality of battery modules are placed; and a pack cover configured to cover an upper side portion of the pack tray and including the air inlet and the air outlet.

The plurality of battery modules include cooling fins that protrude downwards at lower plate portions of the plurality of battery modules and oriented toward the pack tray.

The cooling channel may be secured through gaps among the cooling fins.

The plurality of battery modules may be arranged in two rows in a longitudinal direction on the pack tray, the air inlet may include a first air inlet located over a first battery module in a first row, and a second air inlet located over a first battery module in a second row, and the air outlet may be one, and may be located above an upper portion between a last battery module in the first row and a last battery module in the second row.

The inlet duct module may include a first inlet duct configured to guide a flow of air in a direction from the first air inlet to a cooling channel formed below the battery modules in the first row; and a second inlet duct configured to guide a flow of air in a direction from the second air inlet to a cooling channel formed below the battery modules in the second row.

The first inlet duct may include a first inlet horizontal duct portion including a first inlet duct entrance connected to the first air inlet and arranged over a top side portion of the first battery module in the first row; and a first inlet vertical duct portion bent downwards and extending from the first inlet horizontal duct portion, arranged parallel to a front side portion of the first battery module in the first row, and including, on a lowest end of the first inlet vertical duct portion, a first inlet duct exit open toward the cooling channel.

The second inlet duct may be located to be vertically symmetrical with the first inlet duct, and may include a second inlet horizontal duct portion including a second inlet duct entrance connected to the second air inlet and arranged over a top side portion of the first battery module in the second row; and a second inlet vertical duct portion bent downwards and extending from the second inlet horizontal duct portion, arranged parallel to a front side portion of the first battery module in the second row, and including, on a lowest end of the second inlet vertical duct portion, a second inlet duct exit open toward the cooling channel.

The outlet duct module may include a first outlet duct configured to guide a flow of air in a direction from a cooling channel formed below the battery modules in the first row to the air outlet; a second outlet duct configured to guide a flow of air in a direction from a cooling channel formed below the battery modules in the second row to the air outlet; a first exhaust fan mounted over the battery modules in the first row to be communicatively connected to the first outlet duct; a second exhaust fan mounted over the battery modules in the second row to be communicatively connected to the second outlet duct; and a fan bridge duct including a first opening provided to be communicatively connected to the first exhaust fan, a second opening provided to be communicatively connected to the second exhaust fan, and a third opening provided to be connected to the air outlet.

The fan bridge duct may further include a partition configured to separate an internal space from the first opening to the third opening from an internal space from the second opening to the third opening.

The fan bridge duct may include a duct bottom cover and a duct top cover provided to form an internal space and be vertically combinable with each other, the first opening and the second opening may be formed by combining the duct bottom cover with the duct top cover, and the third opening may be provided over the duct top cover.

In another aspect of the present disclosure, there is provided an electric car including the above-described air-cooled battery pack.

Advantageous Effects

According to an embodiment of the present disclosure, an air-cooled battery pack having excellent space utilization, economic efficiency, cooling performance, etc. while including an exhaust fan built therein to reduce fan noise may be provided.

It will be understood by those of ordinary skill in the art from the following description that various embodiments according to the present disclosure can solve several technical problems not mentioned above.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 2:
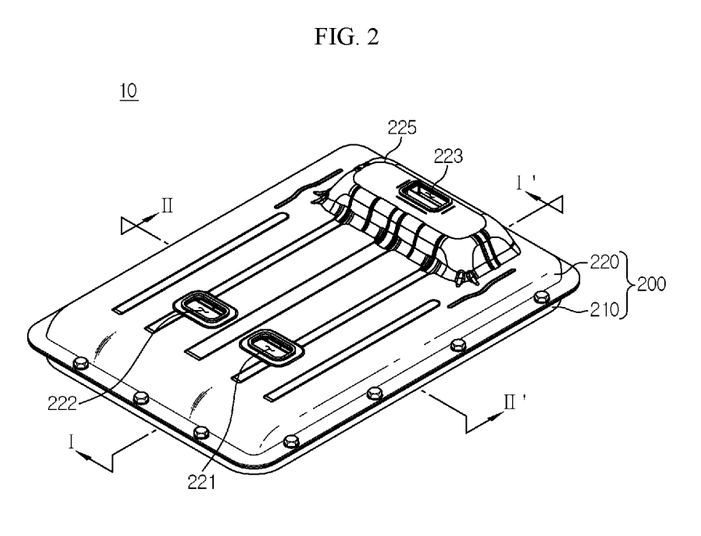
FIG. 2 is a schematic perspective view of an air-cooled battery pack according to an embodiment of the present disclosure.
Figure 3:
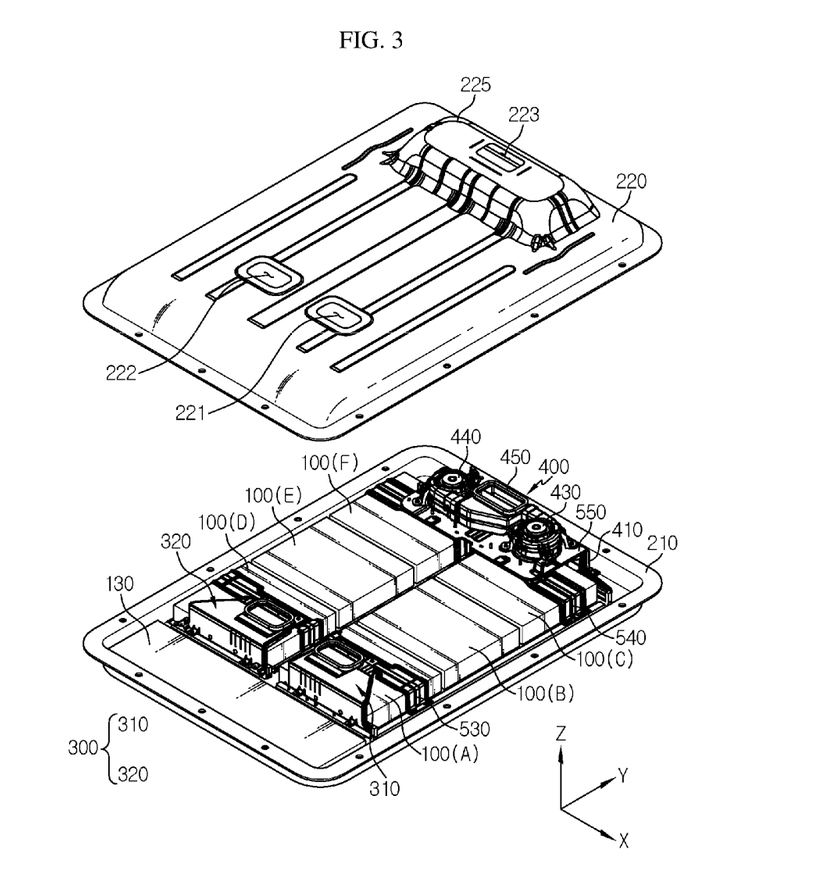
FIG. 3 is a schematic perspective view of the air-cooled battery pack of FIG. 2 from which a pack cover has been separated.
Figure 4:
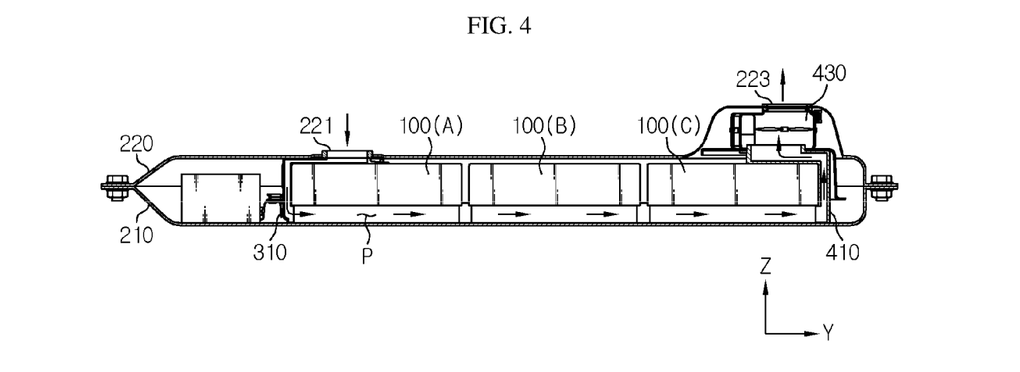
FIG. 4 is a schematic cross-sectional view of the air-cooled battery pack taken along line I-I' of FIG. 2.
Figure 5:
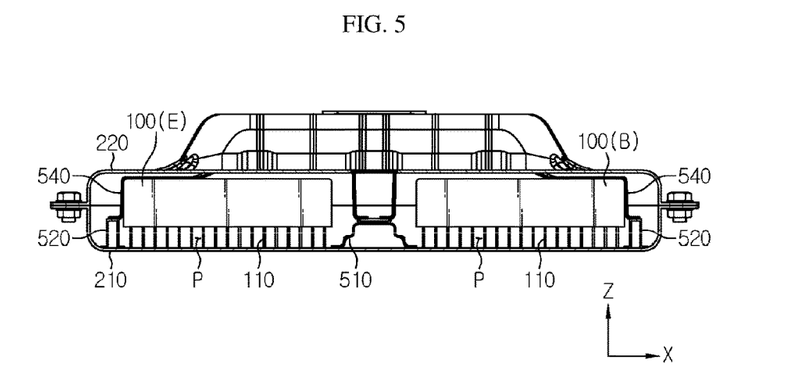
FIG. 5 is a schematic cross-sectional view of the air-cooled battery pack taken along line II-II' of FIG. 2.
Figure 6:
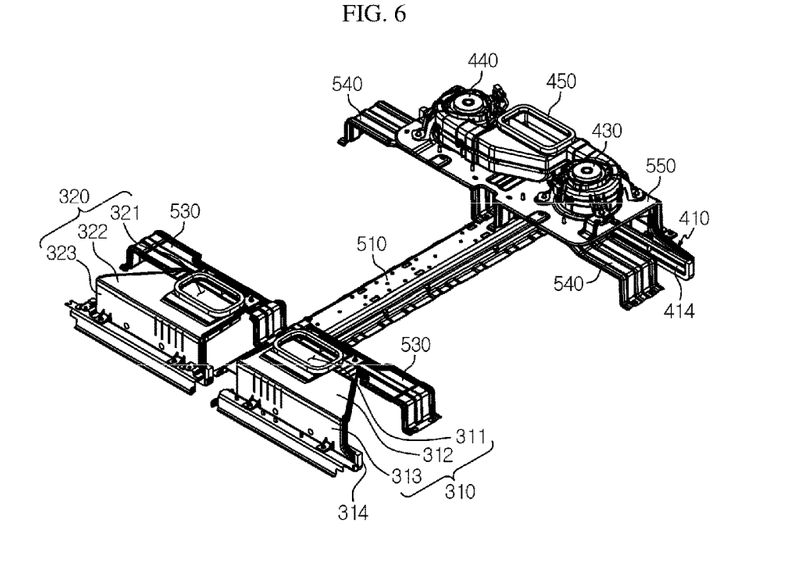
FIG. 6 is a perspective view illustrating an installation structure of an inlet duct module and an outlet duct module according to an embodiment of the present disclosure.
Figure 7:
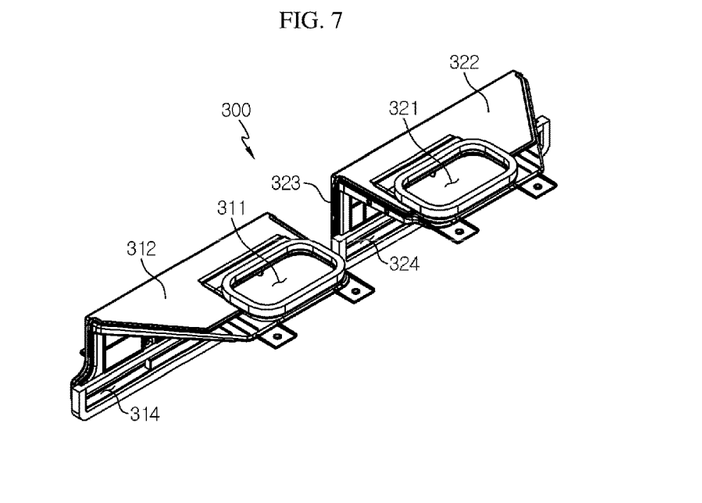
FIG. 7 is a perspective view of the inlet duct module of FIG. 6 viewed in a different direction from a direction in which the inlet duct module is viewed in FIG. 6.

FIG. 2 is a schematic perspective view of an air-cooled battery pack according to an embodiment of the present disclosure, FIG. 3 is a schematic perspective view of the air-cooled battery pack of FIG. 2 from which a pack cover has been separated, FIG. 4 is a schematic cross-sectional view of the air-cooled battery pack taken along line I-I' of FIG. 2, and FIG. 5 is a schematic cross-sectional view of the air-cooled battery pack taken along line II-II' of FIG. 2.

Referring to FIGS. 2 through 4, an air-cooled battery pack 10 according to an embodiment of the present disclosure includes a plurality of battery modules 100, a pack case 200, a cooling channel P, an inlet duct module 300, and an outlet duct module 400 including two exhaust fans 420 and 430.

The battery modules 100 include secondary battery cells (not shown) connected to one another in series and/or in parallel. The secondary battery cells may be pouch-type secondary batteries. The pouch-type secondary battery may include an electrode assembly, an electrolyte, and a pouch outer casing.

The electrode assembly is an assembly of an electrode and a separator, and may be configured such that one or more positive electrode plates and one or more negative electrode plates are disposed with a separator interposed therebetween. An electrode tab may be included in each electrode plate of the electrode assembly and may be connected to an electrode lead. In particular, in the case of pouch-type secondary batteries, one or more electrode tabs may be connected to an electrode lead, and the electrode lead may function as an electrode terminal by being interposed between pouch outer casings and exposing one end to the outside. The pouch outer casing may include an outer insulating layer, a metal layer, and an inner adhesive layer, and may be configured with a laminate sheet capable of accommodating the electrode assembly and the electrolyte and encapsulating the edge by heat bonding.

The configuration of such a pouch-type secondary battery is obvious to those skilled in the art to which the present disclosure pertains, and thus a more detailed description thereof will be omitted.

The pouch-type secondary battery cells may be configured to be accommodated in a module housing in a form in which their wide surfaces are erected and stacked with one another in one direction. In this case, a lower edge of each of the pouch-type secondary battery cells contacts a bottom surface of a module housing. By providing a cooling channel P below such a battery module 100, and allowing cooling air to flow through the cooling channel P so that the bottom surface of the module housing contacts the cooling air, heat exchange between each pouch-type secondary battery cell and the cooling air may be made indirectly.

The battery module 100 may not necessarily include pouch-type secondary batteries. In other words, the battery module 100 may include various other secondary batteries known at the time of filing of the present disclosure, including cylindrical secondary batteries, prismatic secondary batteries, etc. that accommodate an electrode assembly and an electrolyte by using a metal can.

The pack case 200 includes a pack tray 210 on which the plurality of battery modules 100 are placed, and a pack cover 220 that covers an upper surface of the pack tray 210 and is provided to be combinable with the pack tray 210.

Although not shown in detail for the sake of convenience of the drawings, a battery management system (BMS), a battery disconnection unit (BDU) 130, an electric wiring cable, and the like may be mounted on the pack case 200 together with the battery modules 100.

The plurality of battery modules 100 may be arranged in two rows in a longitudinal direction (Y-axis direction) on the pack tray 210.

For example, as shown in FIG. 3, the battery pack according to the present embodiment includes a total of six battery modules 100(A), 100(B), 100(C), 100(D), 100(E), and 100(F), and three battery modules 100 are arranged in the longitudinal direction (Y-axis direction) in each of first and second rows.

Each of the battery modules 100 includes, on its lower plate portion, cooling fins 110 protruding downward with a gap therebetween. For example, a plate-shaped plate including the cooling fins 110 may be attached to the lower plate portion of the battery module 100, or the plate-shaped plate may be employed as the lower plate portion of the battery module 100. The cooling fins 110 may be formed of a metal material having high conductivity, such as aluminum.

Each battery module 100 is arranged on the pack tray 210 such that the cooling fins 110 are oriented toward a bottom surface of the pack tray 210. In this case, the lower plate portion of each battery module 100 is spaced apart from the bottom surface of the pack tray 210 by the cooling fins 110 and supported by the cooling fins 110, and an empty space is provided between the lower plate portion of each battery module 100 and the bottom surface of the pack tray 210. The empty space is used as the cooling channel P.

In other words, the air-cooled battery pack 10 according to the present disclosure cools each battery module 100 by supplying cooling air to the cooling channel P by introducing external air into the pack case 200 through air inlets 221 and 222, and discharges internal air having an increased temperature from the pack case 200 through an air outlet 223.

The pack tray 210 includes a center frame 510 and side frames 520 in order to reinforce the rigidity of the pack tray 210. The center frame 510 may extend in a longitudinal direction (Y-axis direction) between the battery modules 100(A), 100(B), and 100(C) in a first row and the battery modules 100(D), 100(E), and 100(F) in a second row, and the side frames 520 may be two side frames and may extend in the longitudinal direction between the battery modules 100 in the first row and a right wall of the pack tray 210 and between the battery modules 100 in the second row and a left wall of the pack tray 210, respectively.

In addition to the role of reinforcing the rigidity of the pack tray 210, the center frame 510 and the side frames 520 may be used as a structure for fixing an inlet bracket 530, which is used to install an inlet duct module 300, which will be described later, an outlet bracket 540, and a fan-mounting bracket.

The pack cover 220 includes the air inlets 221 and 222 and the air outlet 223.

According to the present embodiment, as shown in FIGS. 2 and 3, the two air inlets 221 and 222 are provided on an upper surface of the pack cover 220 to be located in a front region of the pack case 200, and the one air outlet 223 is provided on the upper surface of the pack cover 220 to be located in a rear region of the pack case 200.

When the pack cover 220 is coupled with the pack tray 210, the two air inlets 221 and 222 and the single air outlet 223 may be vertically matched with a first inlet duct entrance 311, a second inlet duct entrance 321, and a third opening 453 of a fan bridge duct 450, respectively.

In detail, the air inlets 221 and 222 include a first air inlet 221 and a second air inlet 222, and are formed in the pack cover 220 such that the first air inlet 221 is located over the battery module 100(A), which is a first one in the first row, and the second air inlet 222 is located over the battery module 100(D), which is a first one in the second row.

The air outlet 223 is formed in the pack cover 220 to be located above an upper portion between the battery module 100(C), which is a last one in the first row, and the battery module 100(F), which is a last one in the second row.

As shown in FIG. 4, cooling air may be introduced from the outside of the pack case 200 into the pack case 200 through the first air inlet 221 and the second air inlet 222, and may be guided to the cooling channel P through the inlet duct module 300.

As shown in FIGS. 3, 4, 6, and 7, the inlet duct module 300 may include a first inlet duct 310 and a second inlet duct 320.

The first inlet duct 310 guides a flow of the cooling air in a direction from the first air inlet 221 toward the cooling channel P formed below the battery modules 100 in the first row, and the second inlet duct 320 guides a flow of the cooling air in a direction from the second air inlet 222 toward the cooling channel P formed below the battery modules 100 in the second row.

The first inlet duct 310 may include a first inlet horizontal duct portion 312 provided as a plate-shaped body having a hollow structure through which air may flow, and a first inlet vertical duct portion 313 bent downwards and extending from an edge of the first inlet horizontal duct portion 312, and may be arranged to partially surround the first battery module 100(A) in the first row.

The first inlet horizontal duct portion 312 is arranged over a top side portion of the first battery module 100(A) in the first row, and the first inlet vertical duct portion 313 is arranged parallel to a front side portion of the first battery module 100(A) in the first row. The first inlet horizontal duct portion 312 includes the first inlet duct entrance 311 open upwards, and the first inlet vertical duct portion 313 includes, on its lowest end, a first inlet duct exit 314 open toward the cooling channel P.

The first inlet duct entrance 311 may be connected to the first air inlet 221 when the pack tray 210 is coupled with the pack cover 220. In this case, a sealing gasket is mounted on the outside of the first inlet duct entrance 311 to prevent leakage of external air.

A width of the first inlet horizontal duct portion 312 may gradually increase in a direction away from the first inlet duct entrance 311 and thus may become equal to a width of the first inlet vertical duct portion 313. The width of the first inlet vertical duct portion 313 may be provided to approximately correspond to a width of the cooling channel P.

According to this structure, external air may be introduced into the first air inlet 221 and may detour in a direction from the top side portion of the first battery module 100(A) in the first row to the front side portion thereof to be guided to a place where the cooling channel P starts. The external air may spread widely in the first inlet horizontal duct portion 312, may vertically descend along the first inlet vertical duct portion 313, and may enter the cooling channel P.

As the first inlet duct 310 is configured to be in contact with the top side portion and the front side portion of the first battery module 100(A) in the first row as described above, an air passage from the first air inlet 221 to the cooling channel P may be compactly realized.

The second inlet duct 320 is substantially the same as the first inlet duct 310 in terms of structure and function, and thus is arranged to be symmetrical with the first inlet duct 310.

In other words, the second inlet duct 320 includes a second inlet horizontal duct portion 322 arranged over a top side portion of the first battery module 100(D) in the second row, and a second inlet vertical duct portion 323 bent downward and extending from an edge of the second inlet horizontal duct portion 322 and arranged parallel to a front side portion of the first battery module 100 in the second row.

The second inlet horizontal duct portion 322 includes a second inlet duct entrance 321 open upwards to be connected to the second air inlet 222 of the pack cover 220, and the second inlet vertical duct portion 323 includes, on its lowest end, a second inlet duct exit 324 open toward the cooling channel P.

As shown in FIGS. 8 through 12, the outlet duct module 400 may include a first outlet duct 410, a second outlet duct 420, a first exhaust fan 430, a second exhaust fan 440, and a fan bridge duct 450.

The first outlet duct 410 guides a flow of the cooling air in a direction from the cooling channel P formed below the battery modules 100(A), 100(B), and 100(C) in the first row to the air outlet 223, and the second outlet duct 420 guides a flow of the cooling air in a direction from the cooling channel P formed below the battery modules 100(D), 100 (E), and 100(F) in the second row to the air outlet 223.

The first outlet duct 410 plays a role opposite to that of the above-described first inlet duct 310, but the structure of the first outlet duct 410 may be similar to that of the above-described first inlet duct 310. The first outlet duct 410 includes a first outlet horizontal duct portion 412 arranged over a top side portion of the third battery module 100(C) in the first row, and a first outlet vertical duct portion 413 bent downward and extending from an edge of the first outlet horizontal duct portion 412 and arranged parallel to a rear side portion of the third battery module 100(C) in the first row.

The first outlet horizontal duct portion 412 includes a first outlet duct exit 411 open upwards, and the first outlet vertical duct portion 413 includes, on its lowest end, a first outlet duct entrance 414 open toward the cooling channel P.

The second outlet duct 420 is substantially the same as the first outlet duct 410 in terms of structure, and thus is arranged to be symmetrical with the first outlet duct 410.

The second outlet duct 420 includes a second outlet horizontal duct portion 422 arranged over a top side portion of the third battery module 100(F) in the second row, and a second outlet vertical duct portion 423 bent downward and extending from an edge of the second outlet horizontal duct portion 422 and arranged parallel to a rear side portion of the third battery module 100(F) in the second row.

The second outlet horizontal duct portion 422 includes a second outlet duct exit 421 open upwards, and the second outlet vertical duct portion 424 includes, on its lowest end, a second outlet duct entrance 424 open toward the cooling channel P.

The first outlet horizontal duct portion 412 and the second outlet horizontal duct portion 422 may be fixed to and coupled with the outlet bracket 540, and may be arranged parallel to a top side portion of the third battery module 100(C) in the first row and a top side portion of the third battery module 100(F) in the second row, respectively.

According to this structure, cooling air that has exchanged heat with the battery modules 100(A), 100(B), and 100(C) in the first row may enter the first outlet duct entrance 414 at a place where cooling channels P end, may detour around the rear side portion and the top side portion of the third battery module 100(C) in the first row, and may be guided to the first outlet duct exit 411. Cooling air that has exchanged heat with the battery modules 100(D), 100(E), and 100(F) in the second row may enter the second outlet duct entrance 424 at a place where the cooling channels P end, may detour around the rear side portion and the top side portion of the third battery module 100(F) in the second row, and may be guided to the second outlet duct exit 421.

Figure 8:
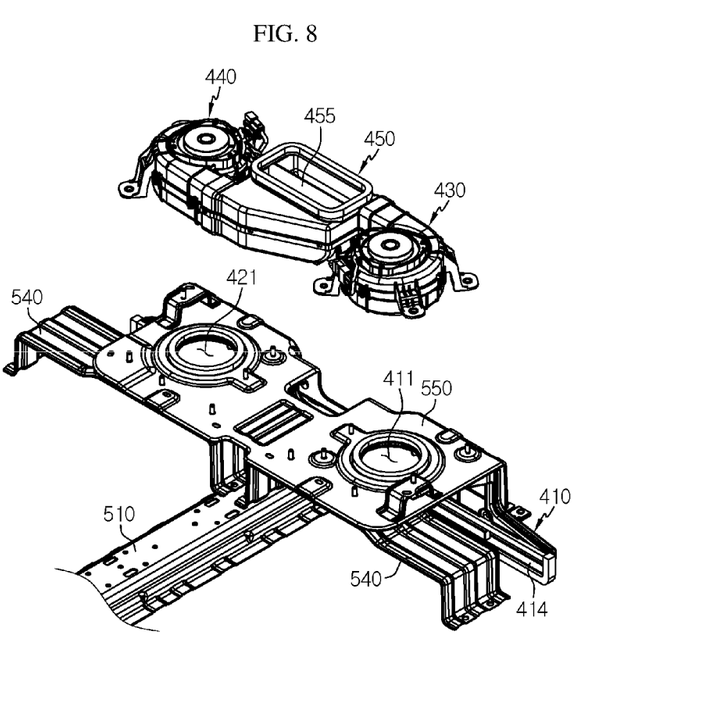
FIG. 8 is a perspective view illustrating two exhaust fans and a fan bridge duct separated from first and second outlet ducts.
Figure 9:
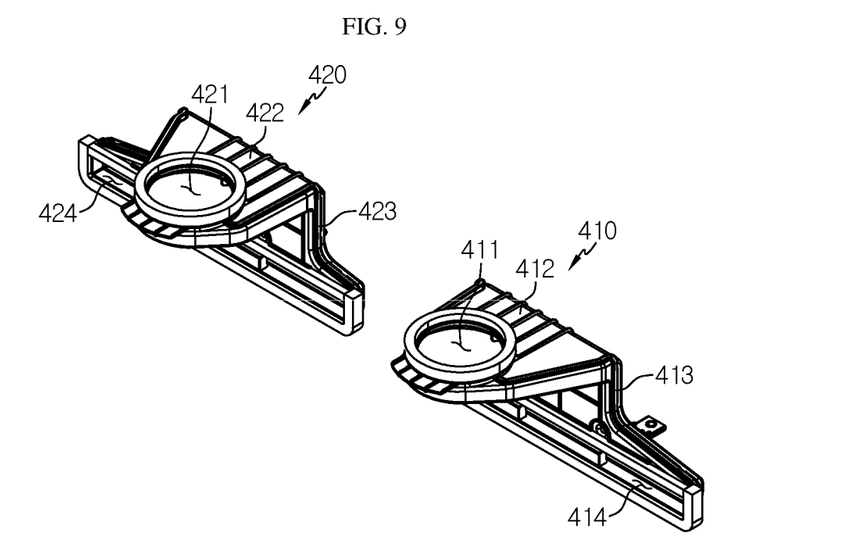
FIG. 9 is a perspective view of first and second outlet ducts.

The first exhaust fan 430 and the second exhaust fan 440 may be detachably provided on the fan bridge duct 450, and may be arranged over the third battery module 100(C) in the first row and the third battery module 100(F) in the second row. In this case, as shown in FIG. 8, the first exhaust fan 430 and the second exhaust fan 440 may be first installed on a fan bracket 550 and may be stably fixed onto and coupled with the fan bracket 550.

The first exhaust fan 430 is mounted over the battery modules 100(A), 100(B), and 100(C) to be communicatively connected to the first outlet duct 410, and the second exhaust fan 440 is mounted over the battery modules 100(D), 100(E), and 100(F) in the second row to be communicatively connected to the second outlet duct 420. For example, the first exhaust fan 430 may be provided to be directly connected to the first outlet duct exit 411, and the second exhaust fan 440 may be provided to be directly connected to the second outlet duct exit 421.

The first exhaust fan 430 sucks the cooling air from the first outlet duct 410 and the cooling channel P communicatively connected to the first outlet duct 410, and the second exhaust fan 440 sucks the cooling air from the second outlet duct 420 and the cooling channel P communicatively connected to the second outlet duct 420.

For example, a conventional air-cooled battery pack connects a large fan of 200 W or more (see FIG. 1) at the outside of a pack case to an air outlet of the pack case and sucks internal air from the pack case 200, whereas, as described above, the air-cooled battery pack 10 according to the present disclosure includes two cooling channels P and thus may sufficiently secure cooling performance even by using two small exhaust fans of about 70 W.

A protrusion region 225 of the pack cover covering the first exhaust fan 430, the second exhaust fan 440, and the fan bridge duct 450 may protrude from the other portions of the pack cover. According to a modification of the protrusion region 225 of the pack cover, the protrusion region 225 of the pack cover may be manufactured in the form of a special cover detachable from the pack cover 220. In this case, when replacement or maintenance of the first exhaust fan 430 and the second exhaust fan 440 is needed, the first exhaust fan 430 and the second exhaust fan 440 may be easily removed by opening the cover of the first exhaust fan 430 and the second exhaust fan 440.

The fan bridge duct 450 collects the air sucked by the first exhaust fan 430 and the second exhaust fan 440 at one place within the pack case 200 and sends the collected air out to the air outlet 223, and may be configured to be communicatively connected to the first exhaust fan 430 and the second exhaust fan 440 and be directly connected to the air outlet 223 of the pack cover 220 in a vertical direction.

Figure 10:
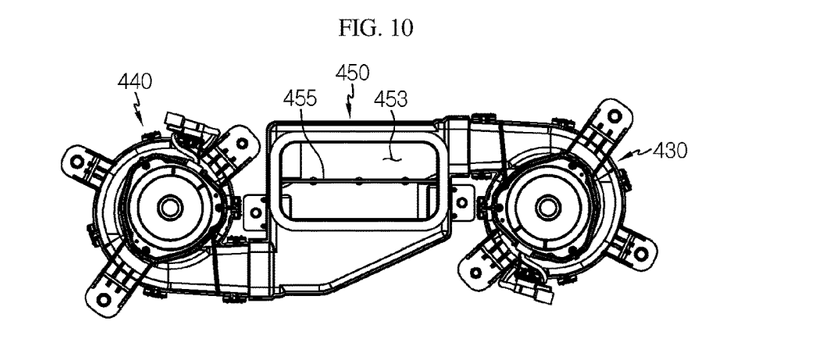
FIG. 10 is a plan view of two exhaust fans and a fan bridge duct.
Figure 11:
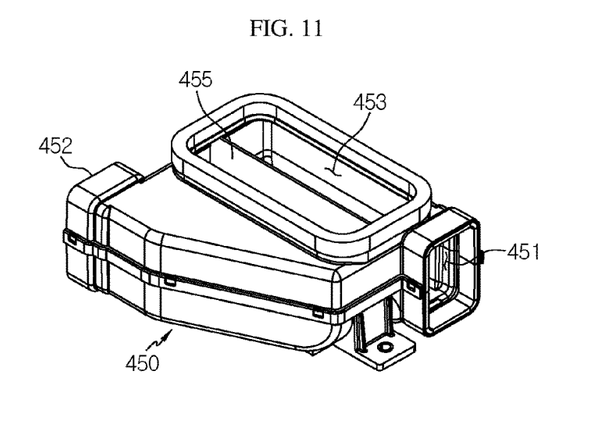
FIG. 11 is a perspective view of a fan bridge duct.

As shown in FIGS. 10 and 11, the fan bridge duct 450 may be provided in the shape of a box including openings in three directions, and the openings in three directions include a first opening 451 formed in a right direction, a second opening 452 formed in a left direction, and a third opening 453 formed in an upper direction.

The first opening 451 may be connected to the first exhaust fan 430, and the second opening 452 may be connected to the second exhaust fan 440. The third opening 453 may be vertically matched with the air outlet 223 of the pack cover 220. A sealing gasket may be mounted on the outside of the third opening 453 to prevent leakage of cooling air.

Figure 12:
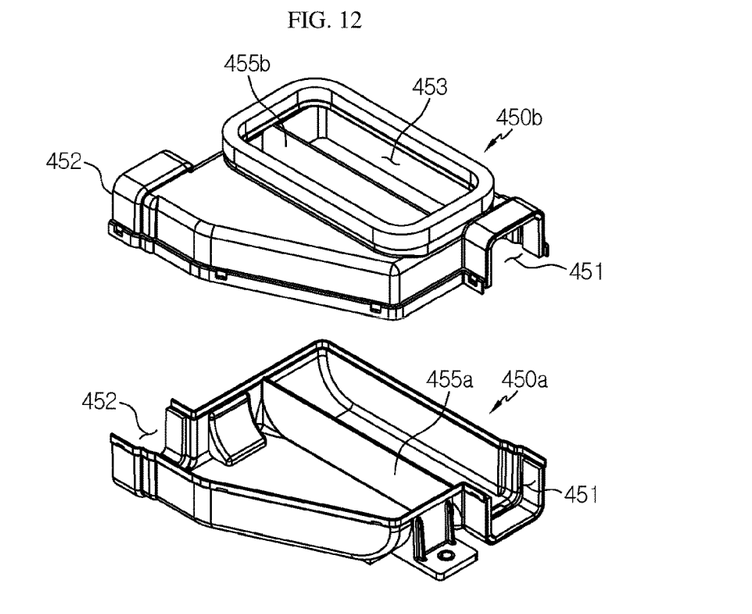
FIG. 12 is an exploded perspective view of a fan bridge duct.

As shown in FIG. 12, the fan bridge duct 450 may include a duct bottom cover 450a and a duct top cover 450b provided to be vertically combined with each other. In this case, the first opening 451 and the second opening 452 may be formed by combining the duct bottom cover 450a with the duct top cover 450b, and the third opening 453 may be provided in an upper portion of the duct top cover 450b.

The fan bridge duct 450 may further include a partition 455 configured to separate an internal space from the first opening 451 to the third opening 453 from an internal space from the second opening 452 to the third opening 453. The duct bottom cover 450a and the duct top cover 450b may include a partition lower plate 455a and a partition upper plate 455b, respectively, and may be configured such that the partition lower plate 455a and the partition upper plate 455b are connected to each other when the duct bottom cover 450a and the duct top cover 450b are combined with each other.

In this case, cooling air immediately flows out directly to the outside of the pack case 200 through the air outlet 223 without moving from the first outlet duct 410 to the second outlet duct 420 or conversely moving from the second outlet duct 420 to the first outlet duct 410, thereby reducing pressure loss and improving cooling efficiency compared with outputs of the first exhaust fan 430 and the second exhaust fan 440.

As described above, according to the configuration of the above-described battery pack of the present disclosure, an air-cooled battery pack having excellent space utilization, economic efficiency, cooling performance, etc. while including an exhaust fan built therein to reduce fan noise may be provided.

Battery packs according to the present disclosure may be applied to vehicles such as electric vehicles or hybrid vehicles. In other words, vehicles according to the present disclosure may include the battery packs according to the present disclosure.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, although terms indicating directions such as up, down, left, right, front, and rear are used in the present specification, these terms are only for convenience of description, and it is apparent to those skilled in the art that these terms may vary depending on a position of a target object or a position of an observer.

What is claimed is:

1. An air-cooled battery pack comprising:
    a plurality of battery modules;
    a pack case including an air inlet and an air outlet, the pack case accommodating the plurality of battery modules;
    a cooling channel formed between the plurality of battery modules and a bottom surface of the pack case;
    an inlet duct module forming an air passage from the air inlet to the cooling channel; and
    an outlet duct module including at least one exhaust fan installed within the pack case to forcedly exhaust air outside of the pack case by forming an air passage from the cooling channel to the air outlet,
    wherein the pack case comprises a pack tray on which the plurality of battery modules are placed, and a pack cover covering an upper side portion of the pack tray and including the air inlet and the air outlet,
    wherein the plurality of battery modules are arranged in two rows in a longitudinal direction on the pack tray,
    wherein the air inlet comprises a first air inlet located over a first battery module in a first row, and a second air inlet located over a first battery module in a second row, and wherein the air outlet is a single air outlet located above an upper portion between a last battery module in the first row and a last battery module in the second row.

2. The air-cooled battery pack of claim 1, wherein the plurality of battery modules include cooling fins that protrude downwards at lower plate portions of the plurality of battery modules and are oriented toward the pack tray,
wherein the cooling channel is defined through gaps among the cooling fins.

3. The air-cooled battery pack of claim 1, wherein the inlet duct module comprises:
a first inlet duct configured to guide a flow of air in a direction from the first air inlet to a cooling channel formed below the battery modules in the first row; and
a second inlet duct configured to guide a flow of air in a direction from the second air inlet to a cooling channel formed below the battery modules in the second row.

4. The air-cooled battery pack of claim 3, wherein the first inlet duct comprises:
a first inlet horizontal duct portion including a first inlet duct entrance connected to the first air inlet and arranged over a top side portion of a first battery module in the first row; and
a first inlet vertical duct portion bent downwards and extending from the first inlet horizontal duct portion, arranged parallel to a front side portion of the first battery module in the first row, and including, on a lowest end of the first inlet vertical duct portion, a first inlet duct exit open toward the cooling channel.

5. The air-cooled battery pack of claim 4, wherein the second inlet duct is located to be symmetrical with the first inlet duct, the second inlet duct comprising:
a second inlet horizontal duct portion including a second inlet duct entrance connected to the second air inlet and arranged over a top side portion of the first battery module in the second row; and
a second inlet vertical duct portion bent downwards and extending from the second inlet horizontal duct portion, arranged parallel to a front side portion of the first battery module in the second row, and including, on a lowest end of the second inlet vertical duct portion, a second inlet duct exit open toward the cooling channel.

6. The air-cooled battery pack of claim 1, wherein the outlet duct module comprises:
a first outlet duct configured to guide a flow of air in a direction from a cooling channel formed below the battery modules in the first row to the air outlet;
a second outlet duct configured to guide a flow of air in a direction from a cooling channel formed below the battery modules in the second row to the air outlet;
a first exhaust fan mounted over the battery modules in the first row to be communicatively connected to the first outlet duct;
a second exhaust fan mounted over the battery modules in the second row to be communicatively connected to the second outlet duct; and
a fan bridge duct comprising a first opening provided to be communicatively connected to the first exhaust fan, a second opening provided to be communicatively connected to the second exhaust fan, and a third opening provided to be communicatively connected to the air outlet.

7. The air-cooled battery pack of claim 6, wherein the fan bridge duct further comprises a partition configured to separate an internal space from the first opening to the third opening from an internal space from the second opening to the third opening.

8. The air-cooled battery pack of claim 7, wherein
the fan bridge duct comprises a duct bottom cover and a duct top cover provided to form an internal space and be vertically combinable with each other, and
the first opening and the second opening are formed by combining the duct bottom cover with the duct top cover, and the third opening is provided over the duct top cover.

9. An electric car including an air-cooled battery pack of claim 1.

* * * * *